(12) United States Patent
Martin et al.

(10) Patent No.: US 10,555,452 B2
(45) Date of Patent: Feb. 11, 2020

(54) ROW CLEANER/CLOSING WHEEL

(71) Applicants: Ronald Steve Martin, Elkton, KY (US); Asghar Rezasoltani, Bowling Green, KY (US)

(72) Inventors: Ronald Steve Martin, Elkton, KY (US); Asghar Rezasoltani, Bowling Green, KY (US)

(*) Notice: Subject to any disclaimer, the term of this patent is extended or adjusted under 35 U.S.C. 154(b) by 0 days.

(21) Appl. No.: 16/041,666

(22) Filed: Jul. 20, 2018

(65) Prior Publication Data

US 2019/0021207 A1 Jan. 24, 2019

Related U.S. Application Data (60) Provisional application No. 62/534,824, filed on Jul. 20, 2017.

(51) Int. Cl.
| | | |
|---|---|---|
| A01B 35/16 | (2006.01) | |
| A01B 49/06 | (2006.01) | |
| A01B 21/08 | (2006.01) | |

(52) U.S. Cl.
CPC ............ *A01B 35/16* (2013.01); *A01B 21/08* (2013.01); *A01B 49/06* (2013.01)

(58) Field of Classification Search
CPC ................................. A01B 35/16; A01B 49/06
See application file for complete search history.

(56) References Cited

U.S. PATENT DOCUMENTS

| | | | | |
|---|---|---|---|---|
| 3,542,139 A * | 11/1970 | Mowbray | ............ | A01B 21/04 172/540 |
| 4,785,890 A * | 11/1988 | Martin | ............ | A01O 7/006 111/139 |
| 5,129,282 A * | 7/1992 | Bassett | ............ | A01B 63/26 111/139 |
| 5,346,020 A * | 9/1994 | Bassett | ............ | A01B 35/16 172/540 |
| 5,497,717 A * | 3/1996 | Martin | ............ | A01O 5/066 111/140 |
| 5,497,836 A * | 3/1996 | Groff | ............ | A01O 7/006 172/555 |
| 5,588,382 A * | 12/1996 | Embree | ............ | A01B 35/16 111/139 |
| 7,757,777 B1 * | 7/2010 | Wipf | ............ | A01O 5/066 111/192 |
| 7,861,660 B2 * | 1/2011 | Martin | ............ | A01O 5/06 111/140 |
| 7,975,629 B1 * | 7/2011 | Martin | ............ | A01O 5/066 111/140 |

(Continued)

FOREIGN PATENT DOCUMENTS

EP 2140747 A2 * 1/2010 ............ A01B 35/16

*Primary Examiner* — Tara Mayo-Pinnock
(74) *Attorney, Agent, or Firm* — Duncan Galloway Egan Greenwald, PLLC; Kevin T. Duncan (57) ABSTRACT

An improved row cleaning/closing wheel having improved debris removing and/or furrow closing performance with complimentary left and right cleaning/closing wheel pairs having complimentary teeth configurations to provide spatial, angular and rotational intermeshed cleaning and/or closing operation during row planting. The improved row cleaning wheel for use with a floating row cleaner and/or closing arm assemblies attached to a row planter during planting operation.

25 Claims, 8 Drawing Sheets

(56) References Cited

U.S. PATENT DOCUMENTS

| | | | | |
|---|---|---|---|---|
| 8,291,998 B1* | 10/2012 | Berg | ................ | A01O 5/066 |
| | | | | 172/173 |
| 8,631,879 B1* | 1/2014 | Martin | ................ | A01O 5/062 |
| | | | | 172/540 |
| 2013/0276683 A1* | 10/2013 | Martin | ................ | A01O 5/06 |
| | | | | 111/140 |

* cited by examiner

ROW CLEANER/CLOSING WHEEL

CROSS-REFERENCE TO RELATED APPLICATIONS

This patent application claims benefit of priority under 35 U.S.C. § 119(e) to U.S. Provisional Patent Application Ser. No. 62/534,824 filed Jul. 20, 2017, entitled AGRICULTURAL TILLING BLADES, the entirety of which is hereby incorporated by reference.

FIELD OF THE INVENTION

The present disclosure is generally applicable to the field of agricultural equipment, and more particularly for improved row cleaning and more particularly in no-till farming applications.

AUTHORIZATION PURSUANT TO 37 C.F.R. § 1.171 (d)(c)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The background description includes information that may be useful in understanding the present invention. It is not an admission that any of the information provided herein is prior art or relevant to the presently claimed invention, or that any publication specifically or implicitly referenced is prior art.

In traditional and longstanding farming methods, tilling or tillage is typically used before planting to prepare a field. Tilling a field has both herbicidal and insecticidal benefits and may serve to break up the earth to enable seedlings to more easily extend root systems. However, there are downsides to tillage that are driving modern farmers towards "low-till" or "no-till" farming systems. In these farming systems, plant matter left over from previous harvests, called residue, is left in the fields between plantings. At the time of planting, a row cleaner system is used with a planter to clear only a small portion or strip of earth of the residue to enable seeds and fertilizer to be placed in the ground. The row cleaner removes the residue and only very lightly tills the topmost soil or earth to provide for a clear path for seed and fertilizer placement.

No-till farming systems provide for benefits including increased water retention and absorption, and increased presence of beneficial fungi, bacteria, and fauna (e.g., earthworms). The use of a no-till farming system has the additional benefit of reducing topsoil erosion that may be caused by tilling. In no-till systems it has also been shown that because water retention is greater and soil erosion is reduced, the environmental impact from the runoff of fertilizer, herbicides, and pesticides is also reduced.

The movement towards no-till farming systems has driven the improvement of row cleaner apparatuses for planting systems. Existing row cleaner systems include fixed row cleaners, adjustable row cleaners, and floating row cleaners and a variety of row cleaner wheels. One problem with existing row cleaning wheel designs is that residue or debris follow the rotating wheel on the surfaces of the teeth, which is unwanted as it causes clogging and lowers overall performance.

What is needed is a row cleaner wheel configured and adapted to avoid excessive soil and ground debris from following and traveling with the rotation of the wheel during planting operation to avoid clogging and other detrimental effects when used in a row planter or planter system.

SUMMARY OF THE INVENTION

The present invention provides an improved row cleaning/closing wheel configured in a beneficial way to avoid undesired collection of debris during operation of a row planter when mounted on a row cleaner assembly. The inventive row closing wheel may also or additionally used at the rear end of the row planter for assisting in closing furrows at the end of row planter operation.

In a first embodiment, the present invention provides a row cleaner wheel assembly for mounting to a row cleaner assembly of a row planter, the row cleaner wheel assembly comprising: a row cleaner wheel mount assembly having a first portion adapted to be mounted to a row cleaner assembly and a second portion adapted for mounting one or more row cleaner wheels; a first row cleaning wheel being substantially circular with a circular center hub opening for mounting the first row cleaning wheel to the row cleaner wheel mount assembly and having a first set of teeth arranged about the outer circumference of the first row cleaning wheel; wherein each of the first set of teeth include a tooth body extending outward along the periphery of the first row cleaning wheel and having an essentially flat surface and a beveled surface that are relatively narrower at a distal end of the tooth and wider proximally toward the center of the row cleaning wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth.

The row cleaner assembly may further comprise: a second row cleaning wheel being substantially circular and mounted to the row cleaner wheel mount assembly and having a second set of teeth arranged about the outer circumference of the second row cleaning wheel; wherein the first and second row cleaning wheels are disposed on the row cleaner mount assembly spatially removed at respective centers and having essentially equal diameters, disposed on the row cleaner mount assembly to be oppositely facing and angled toward one another proximal to a ground surface and angled outwardly away from one another distal to the ground surface, the relative angle being adapted to allow the first and second sets of teeth to intermesh when rotated in unison during operation of a row planter.

The row cleaner assembly may be further characterized by one or more of the following features: wherein the relative angle is approximately 60 degrees; wherein the first set of teeth comprise 12 teeth separated sequentially by approximately 30 degrees relative to the center of the row cleaner wheels; wherein the tooth profile includes a generally radiused outward surface extending outward-most from the row cleaner wheel and intermediate the parallel lines; wherein the tooth profile includes generally radiused transitions from the outer periphery of the row cleaner wheel; wherein the beveled surfaces of the first and second sets of teeth operate to provide a cleaning action at the intersection of the teeth during row planter operation; further comprising a second row cleaner wheel, wherein the first and second row cleaner wheels are attached to said row cleaner wheel mount assembly so that the first and second row cleaner wheels are intersectedly positioned; wherein the first and second row cleaner wheels are non-intersectedly positioned during an initial engagement with a ground surface.

In a second embodiment, the present invention provides A row cleaning wheel for mounting to a row cleaning assembly for use in operation of a row planter and adapted to remove debris, the row cleaning wheel comprising: a substantially circular body portion; a circular center hub opening disposed at the center of the circular body portion for positioning the row cleaner wheel on a hub of a row cleaner mount assembly; a set of holes for receiving fastening members for mounting the row cleaning wheel to a row cleaner wheel mount assembly; and a first set of teeth arranged about the outer circumference of the circular body portion; wherein each of the first set of teeth include a tooth body extending outward along the periphery of the first row cleaning wheel and having an essentially flat surface and a beveled surface that are relatively narrower at a distal end of the tooth and wider proximally toward the center of the row cleaning wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth.

BRIEF DESCRIPTION OF THE FIGURES

In order that the advantages of the cleaning wheel will be readily understood, a more particular description of the cleaning wheel briefly described above will be rendered by reference to specific embodiments illustrated in the appended drawings. Understanding that these drawings depict only typical embodiments of the cleaning wheel and are not therefore to be considered limited of its scope, the cleaning wheel will be described and explained with additional specificity and detail through the use of the accompanying drawings.

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 1:
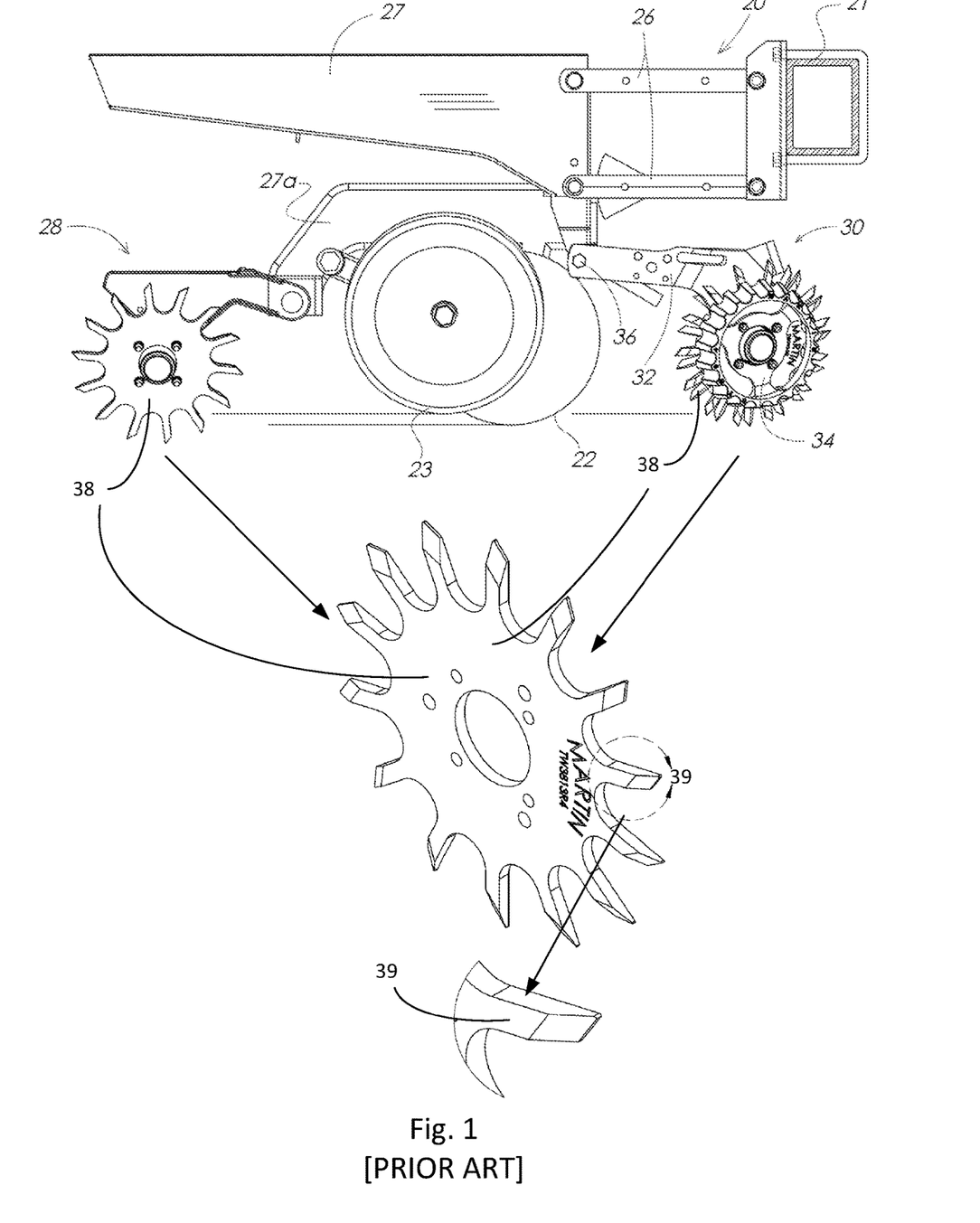
FIG. 1 illustrates a planter row unit having a front end row cleaning assembly and a rear or back end closing assembly each having a row cleaning/closing wheel as found in the prior art.

Referring now to the drawings, wherein like reference numerals designate identical or corresponding parts throughout the several views, FIG. 1 provides a side view of a prior art planter row unit 20 to which an embodiment of the adjustable row cleaner 10 may be been mounted. Planter row units 20 are generally mounted to a tool bar 21 or similar structure using linkage 26, which may be oriented in a parallel fashion as shown in FIG. 1, or which may be non-parallel in other embodiments not pictured herein.

The planter row unit 20 generally includes a row unit frame 27 and a row unit sub-frame 27a, both of which are typically pivotally affixed to the linkage 26. The row unit sub-frame 27 typically supports a furrow opener 22 that operates to open a furrow in the ground surface. Although not shown in the embodiments pictured herein, the planter row unit 20 often includes a down pressure member (not shown) for applying a biasing force to the furrow opener 22. The row unit sub-frame also supports a depth regulator 23 for regulating the depth of the furrow and a furrow closer 28 for closing the furrow.

A seed delivery mechanism (not shown) may be mounted to the row unit frame 27 and/or row unit sub-frame 27a for delivering seed to the opened furrow. The row unit frame 27 typically supports at least one container (not shown) for holding seed, fertilizer, or other material. The row unit sub-frame 27a includes a row unit front plate 29, which is oriented towards the direction of travel of the planter row unit 20. Planter row units 20 such as those shown in FIG. 1 as well as other seeding machines are well known to those practiced in the art and the operation of such will therefore not be discussed in detail herein for reasons of clarity.

A row cleaner assembly 30 may be mounted to a planter row unit 20. The row cleaner assembly 30 as pictured herein includes a row cleaner frame 32 that is pivotally mounted to the row unit sub-frame 27a at the row unit front plate 29. The row cleaner frame 32 is pivots with respect to the planter row unit 20 about a row cleaner frame pivot 36. The row cleaner frame 32 extends forwardly from the row unit front plate 29, and a pair of row cleaner wheels 34 is pivotally affixed to the row cleaner frame 32 opposite the row cleaner frame pivot 36, which is described in more detail below. Those skilled in the art will appreciate that the row cleaner assembly 30 as disclosed may be mounted on a row unit front plate 29 through any method and/or structure known to those skilled in the art such as bolts, nuts, and corresponding apertures, chemical adhesion, clamps, welding, etc.

The row cleaner frame 32 in the first embodiment thereof is comprised of two row cleaner frame arms 32a connected to one another at the second ends thereof. The two row cleaner frame arms 32a may be oriented so that they form a line of symmetry between them in the direction of travel of the planter row unit 20. In this respect, the row cleaner frame arms 32a are shaped similarly to a wishbone or are V- or U-shaped. Each row cleaner frame arm 32a has a first and second end. The first end forms the row cleaner frame pivot 36 at the two points where the row cleaner frame arms 32a attach to the row unit front plate 29. As generally described above, the row cleaner frame arms 32a are pivotal with respect to the row unit sub-frame 27a about the row cleaner frame pivot 36 so that the row cleaner assembly 30 is floating or semi-floating, as is known to those skilled in the art.

The row cleaner frame arms 32a come together and are attached to one another at their second ends to form one contiguous row cleaner frame 32 as shown in the embodiments pictured herein. In the embodiments pictured herein, the connection point of the two row cleaner frame arms 32a is shaped similarly to an upside-down U. In other embodiments not shown herein, the connection point will be oriented differently and may have a different shape. For example, the connection point of the row cleaner frame arms 32a may be a substantially flat piece of material simply connecting the second ends of the row cleaner frame arms 32a. As those skilled in the art will appreciate, depending on the orientation of the row cleaner wheels 34 (explained in detail below) and row cleaner frame arms 32a, the connection point may have different shapes and/or orientations than the connection points pictured herein without departing from the scope of the adjustable row cleaner 10.

A row cleaner wheel 34/38, may be a unitary or assembled or joined row cleaning wheel 38/side treader wheel 34 and may be mounted at the second end of each row cleaner frame arm 32a. The row cleaner wheel 34/38 may be pivotally mounted to the row cleaner frame 32, or it may be mounted to a row cleaner wheel hub (not shown) that is either attached to or integrated into the row cleaner frame 32. The row cleaner wheel 34/38, row cleaner wheel hub (if so configured), and row cleaner frame arms 32a are configured so that the row cleaner wheel 34/38 is free to rotate about the row cleaner frame arms 32a. The operation and benefits of ground driven row cleaner wheels 34/38 with teeth 39 is well known to those skilled in the art and will not be described further herein for purposes of clarity. A coulter (not shown) may be mounted between the row cleaner frame arms 32a without interference with the operation of any elements of the planter row unit 20. Other accessory tools may also be mounted between the row cleaner frame arms 32a in embodiments not pictured herein.

Row cleaner assemblies 30 having a single row cleaner wheel 34/38 mounted thereto may be used with the adjustable row cleaner 10 as disclosed herein without limitation. The adjustable row cleaner 10 as disclosed and claimed herein may be used with any type of floating row cleaner frame 32 and is not limited to the embodiments thereof as pictured herein. For example, the adjustable row cleaner may be used with single-arm row cleaner frames (not shown) or U-shaped row cleaner frames 32 having different orientations than the one shown in the various figures herein.

While the invention is largely described for purposes of explaining exemplary use of the invention in connection with row cleaning at the front end of a row planter, the inventive row cleaning/closing wheels 40/50 is equally useful at the back end of the planter for closing a planted furrow. Spading closing wheels move soil toward the seed at planting depth, while lifting and fracturing the surface layer to achieve compaction free closing of the seed trench in wet, hard, or sod conditions. With soil firmed around the seed from each side and the surface layer loosened, crops emerge sooner and planting can be done at the proper depth, even in wetter conditions, without fear of crushed soil above the seed preventing emergence.

Spading closing wheels preferably do not attempt to close the seed trench by a crushing action from the top down. The soil is wedged toward the seed from either side at seeding depth by a pair of Martin Row Cleaner wheels. The ends of the teeth have full bevels cut on them. The beveled sides of the teeth on each wheel are placed toward the row and the narrow edge enters the soil first producing a wedging action. As the teeth on the wheels rotate up out of the soil, a slight lifting and crumbling occurs in the surface layer. The area on either side of the seed and immediately above it is not fractured. Because of the shape and spacing of the teeth on these wheels, wet soil does not bind to them Now with reference to FIGS. 2 and 3, "Left-side" cleaning/closing wheel 40 includes a series of teeth 41 and "Right-side" cleaning/closing wheel 50 includes a series of teeth 51. As shown, during rotational path of the wheel, the teeth 41/51 exit and become perpendicular to the ground. The design intent is so any foreign material that may try to wrap or stick to the teeth will fall off. The problem with standard toothed wheels is that in some conditions they wrap due to the teeth being straight. like the standard wheel 38 of FIG. 1, which pulls residue apart rather than cutting it as in the case of the present invention wheel 40/50 and teeth 41/51. It has fully beveled teeth on one side but could be manufactured with a smaller amount of bevel on both sides. The present invention offers two distinct versions of wheel, left and right, and provides an improved performance over prior wheels, e.g., those that do not come in lefts and rights and are beveled on both sides.

Figure 2:
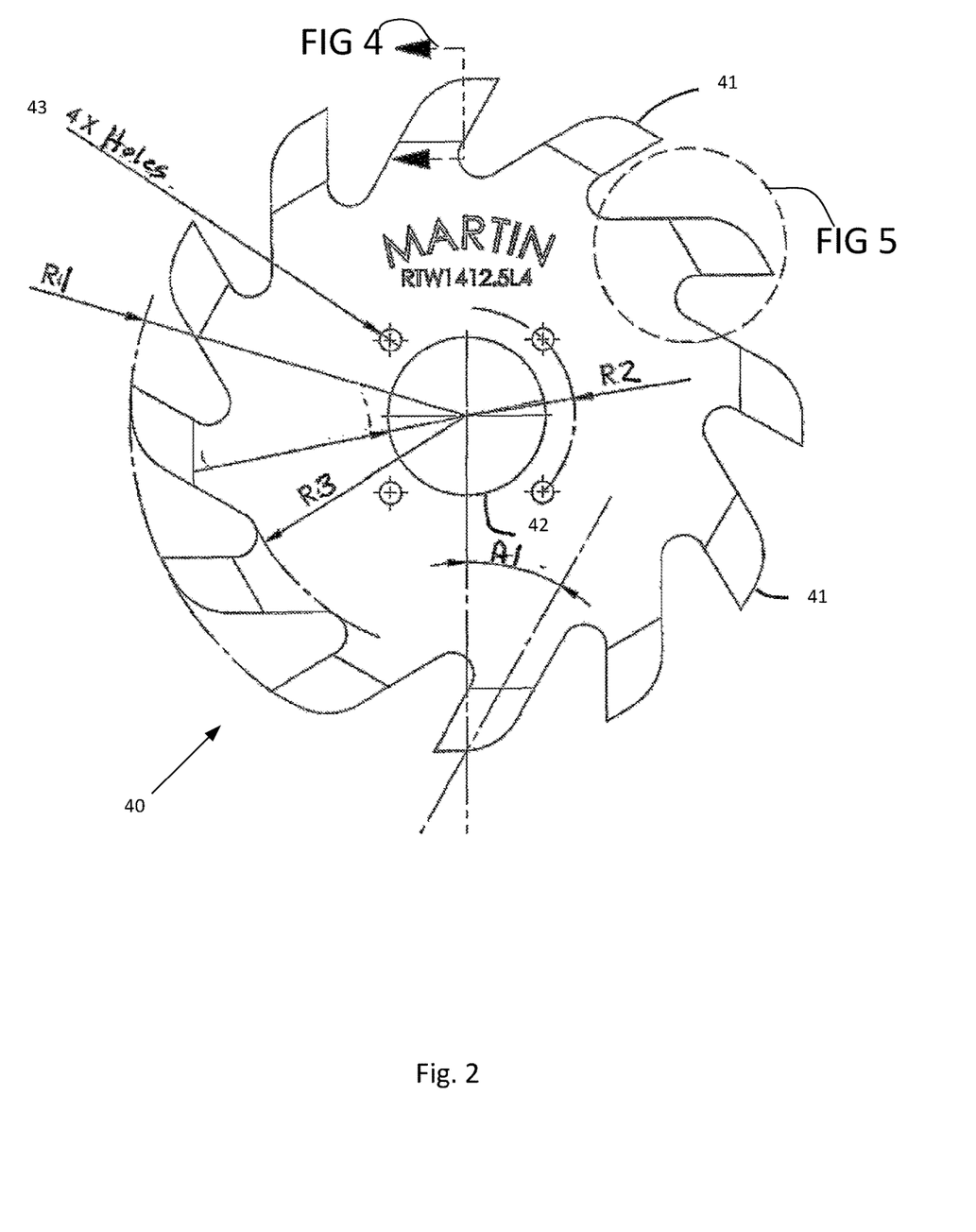
FIG. 2 provides a side view of a left-side row cleaning/closing wheel in accordance with the present invention.
Figure 3:
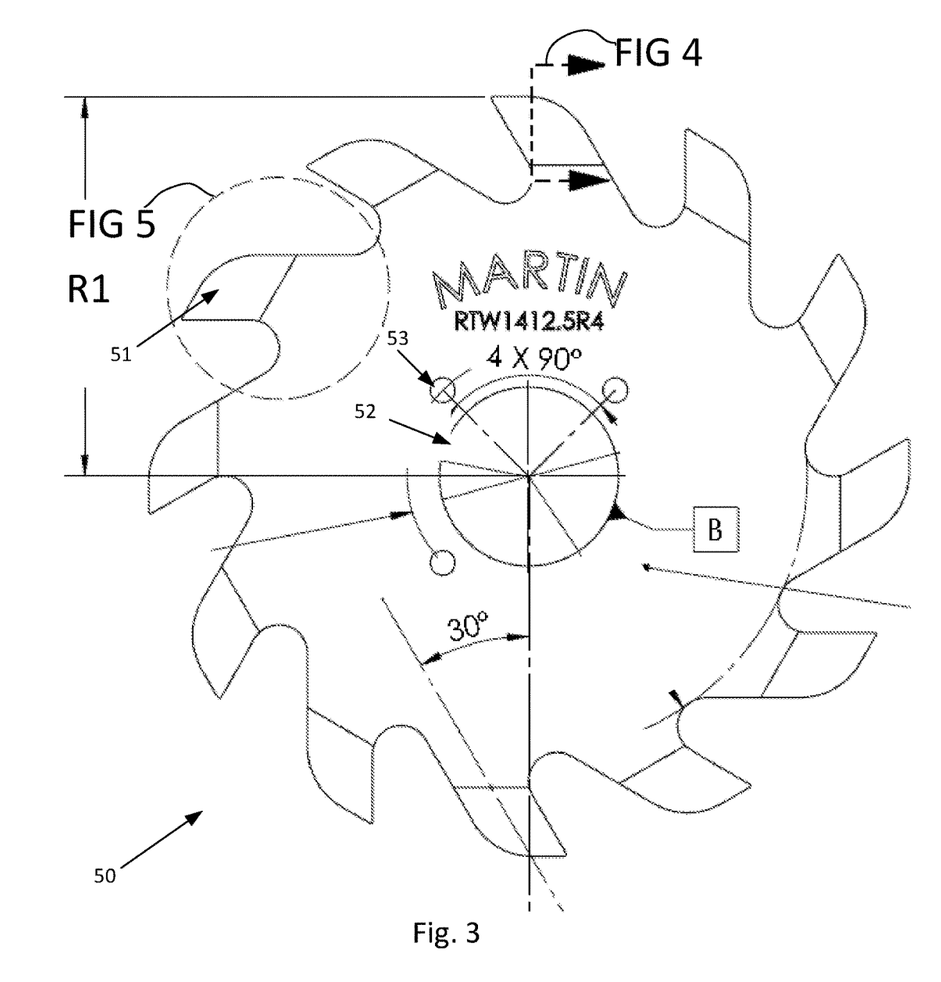
FIG. 3 provides a side view of a right-side row cleaning/closing wheel in accordance with the present invention.
Figure 4:
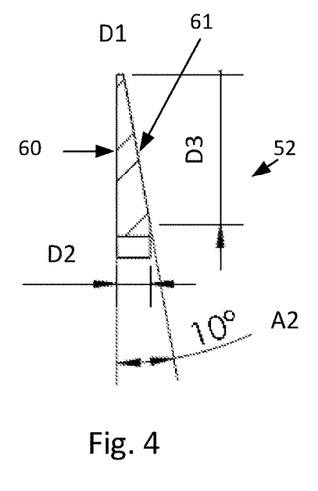
FIG. 4 provides a cross-sectional view of a tooth configuration in accordance with an exemplary embodiment of the present invention.
Figure 5:
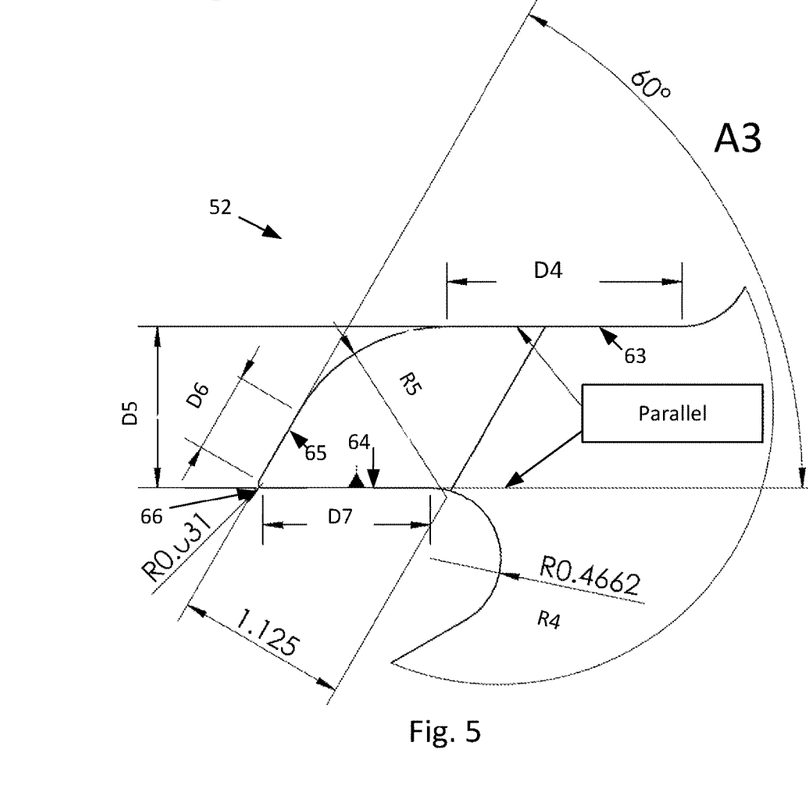
FIG. 5 provides a side view of a portion B of the tooth configuration in accordance with an exemplary embodiment of the present invention.
Figure 6:
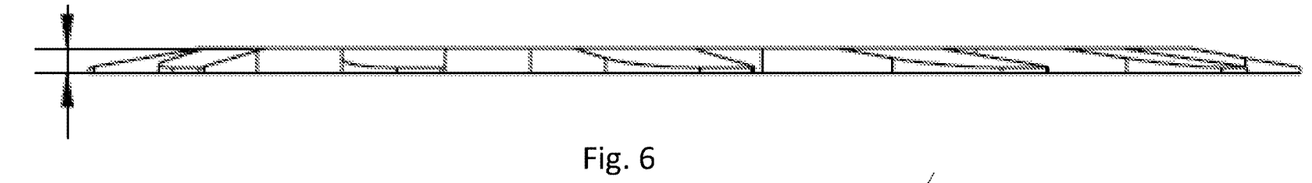
FIG. 6 provides a top/bottom view showing a beveled aspect of the tooth configuration in accordance with an exemplary embodiment of the present invention.

FIGS. 4-6 illustrate the right-side version row cleaning/closing wheel 50 (FIG. 3) and provide details of tooth configurations for teeth 51. In an opposite but similar fashion, the details of the tooth configurations shown in FIGS. 4-6 apply to the reverse orientation of teeth 41 of row cleaning/closing wheel 40 (FIG. 2).

Referring now to the exemplary drawings, and more particularly to FIGS. 2-8, there are shown two versions, left and right, of row cleaning/closing wheels 40 and 50, which may be used individually or in combination. For example, circular wheels 40/50 may be used as a coulter on a cultivator or as part of an agricultural planter row section. Left and right wheels 40/50, respectively, have a central hub 42/52 and a series or set of multiple teeth or tines 41/51 extending from the central body and radiating outwardly along the 360-degree periphery. In this example the set of teeth comprises 12 teeth equally separated 30 degrees (360 degrees divided by 12=30 degrees) about the periphery. The central body, in the present example but not by way of limitation, has four mounting holes to secure wheel 40/50 to a rotating hub of a row cleaner assembly, for example. Wheel 40/50 preferably has a radius R1 of a preferred dimension, which can be 4-11 inches, or more specifically 6-7 inches, or approximately 6 inches or 6.25 inches. A radius R2 defines a distance from the center of wheel 40/50 to the location of the four mounting holes. A radius R3 defines an inner radius that subscribes a circle on the body of wheel 40/50 and is tangent to an inside radius of the voids between teeth or tines 41/51. Radius R3 can be approximately 2 inches less than radius R1, i.e., a radius of 4-5 inches or approximately 4.4 inches. The teeth 41/51 have a central longitudinal line that is angled at angle A1 from a ray emanating from the center point of the respective wheel 40/50. Angle A1 can be approximately 30 degrees or between 28 and 32 degrees, or approximately 29.5 degrees.

Referring to FIG. 4, teeth 51 have a cross-sectional profile with surfaces 60 and 61 being angled relative to each other by an angle A2, which can be approximately 10 degrees. Note that surface 61 is substantially perpendicular to a rotational axis of wheel 50, as such surface 60 is beveled. As such each of the teeth 51 have a similar bevel on one side of wheel 50 of the present invention, left-side wheel 40 has teeth 41 with bevels on the opposite side so that in their application the two wheels/teeth configurations provide mirror image wheels or blades that may be used in tandem or to complement each other. The bevel is defined by the dimension denoted as D1 as surface 60 proceeds toward the center of wheel 50 to dimension D2 over a length of dimension D3, where D1 can be 0.05 inch; D2 approximately 0.25 inch and D3 greater than an inch.

Now viewing the elements of each tooth 51 as illustrated in the B-view of FIG. 5, sides 63 and 64 of tooth 51 are parallel or substantially parallel having dimensions D4 and D7 respectively accorded to them, with dimension D4 being approximately 1.7 inches and dimension D7 being approximately 1.3 inches. Tooth 51 has a distance D5 between sides 63 and 64, which is approximately 1 inch. From a point 66 of tooth 51 there is a straight section 65 having a dimension D6 of approximately 0.5 inch extending at an angle A3 of approximately 60°, with a radius R5 of approximately 1.2 inches extending from section 65 to side 63. It is contemplated that angle A3 maybe set from approximately 45° to approximately 75°. A radius R4 of approximately 0.4 inch extends from side 64 to a side 63 of an adjacent tooth.

It is contemplated that wheel 40/50 will often be sized at 11-14 inches, with other sizes, such as 8 or 9 inches, which would work well on Case-IH early riser planters to close the seed trench in place of a straight tooth wheel of 9 inches or the OEM 8-inch smooth closing disc. Wheel 40/50 could also be used in larger sizes to open a trench for fertilizer to be placed in, for example, a UMO-100 single disc fertilizer opener, replacing the smooth disc with a 15-inch row cleaning/closing wheel 40/50 which should turn easier and require less down force to penetrate the soil.

Wheel 40 also works well to close seed trench on, for example, Mex Emerge style planters in place of the factory rubber closing wheels, in a manner similarly to spading closing wheels, also provided by the Applicant. It is further contemplated that liquid fertilizer can be placed beside a wheel 10 as it closes the seed trench in another improved version.

With reference to FIG. 5, note that sides 63 and 64 are parallel and that teeth 51 are rotated at angle A1 of 29.5 degrees from vertical. Accordingly, in this configuration wheel 50 also has a 60.5-degree angle A3 on the crown compared to teeth of the prior art, e.g., prior art teeth that have a radius equaling half the diameter. Applicant's wheel 50 also has wider teeth and an angle A2 of the bevel down to 10° so it will cut material rather than pull it apart like other wheels do. The present invention has, as previously mentioned, left and right-hand bevels, as compared to the prior art that has small amount of bevel on both sides of each tooth.

Figures 7, 8:
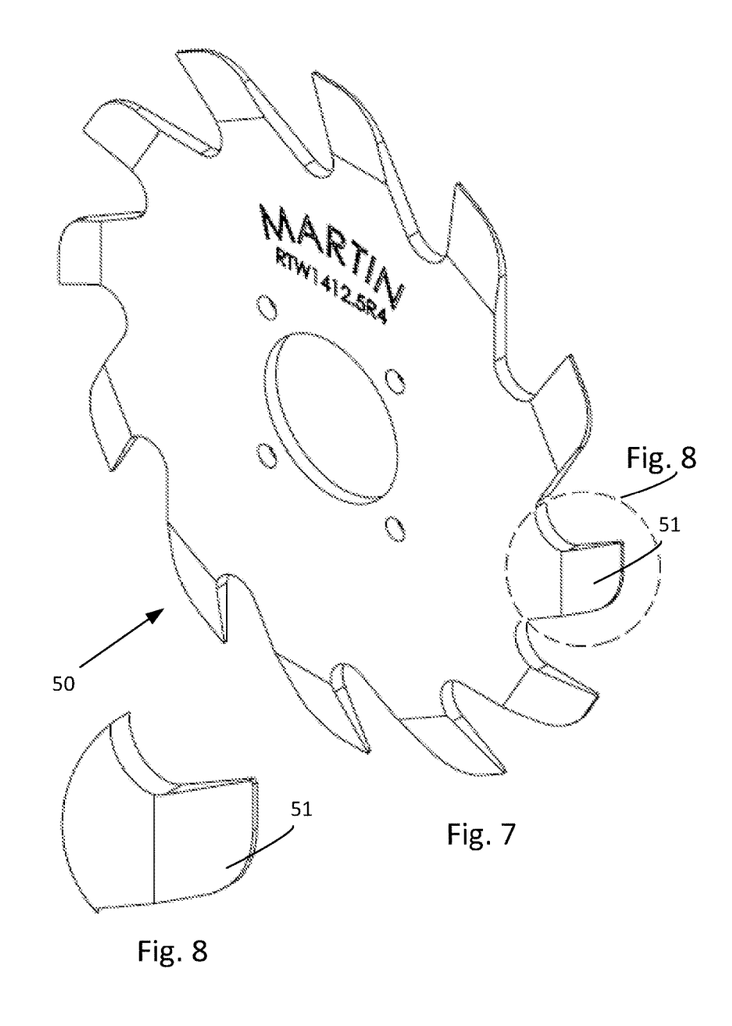
FIG. 7 provides a perspective view of the right-side row cleaning/closing wheel of FIG. 3.
FIG. 8 provides a perspective view of the tooth configuration of the right-side row cleaning/closing wheel of FIG. 5.

FIG. 6 illustrates a side-view of the row cleaning/closing wheel 50. FIGS. 7 and 8, respectively, are perspective views of the right-side row cleaning/closing wheel or disc 50 (or portion thereof) illustrated in FIGS. 3 and 5.

Figure 9:
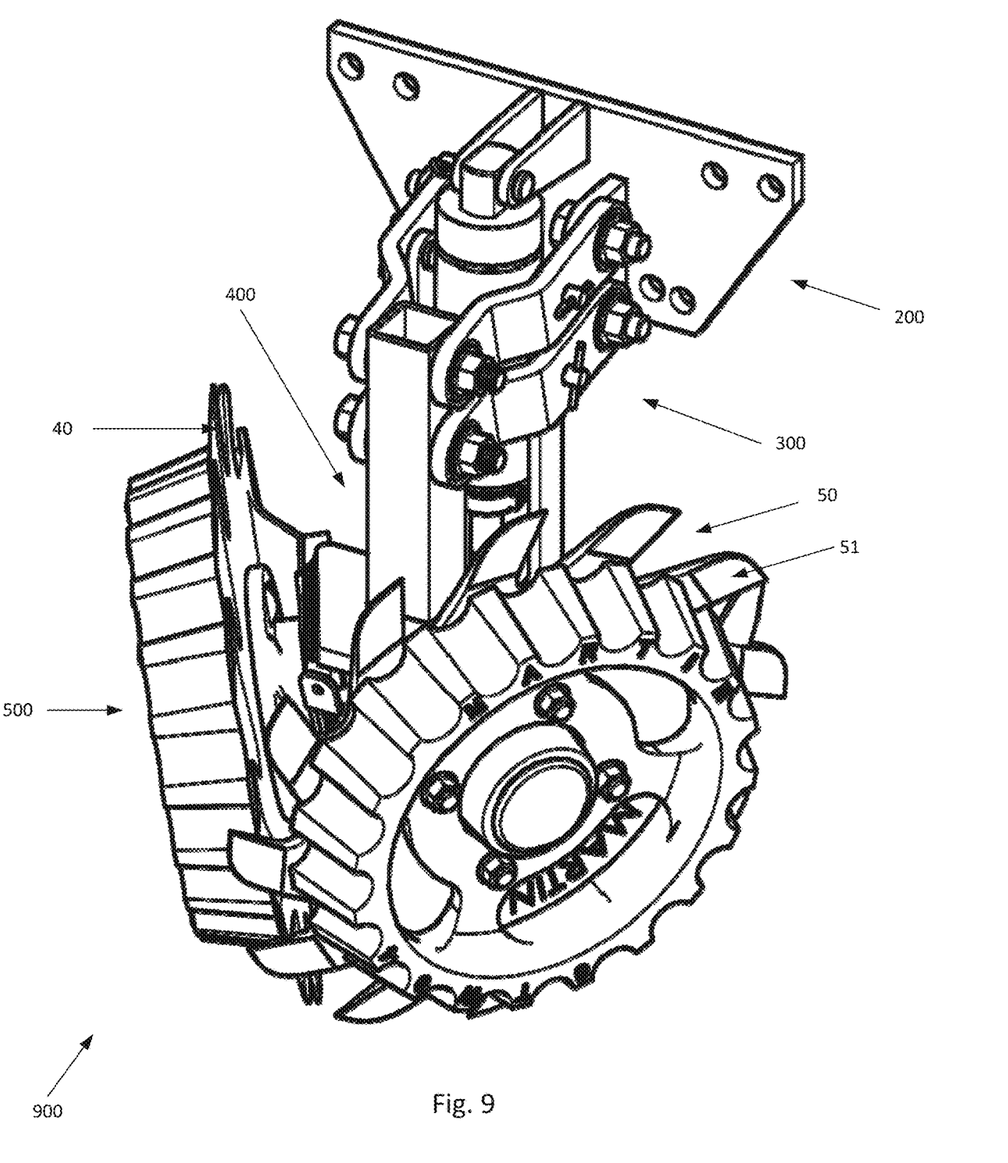
FIG. 9 provides a perspective view of a compact parallel arm row cleaner assembly including an improved row cleaner wheel according to an embodiment of the present invention.
Figure 10:
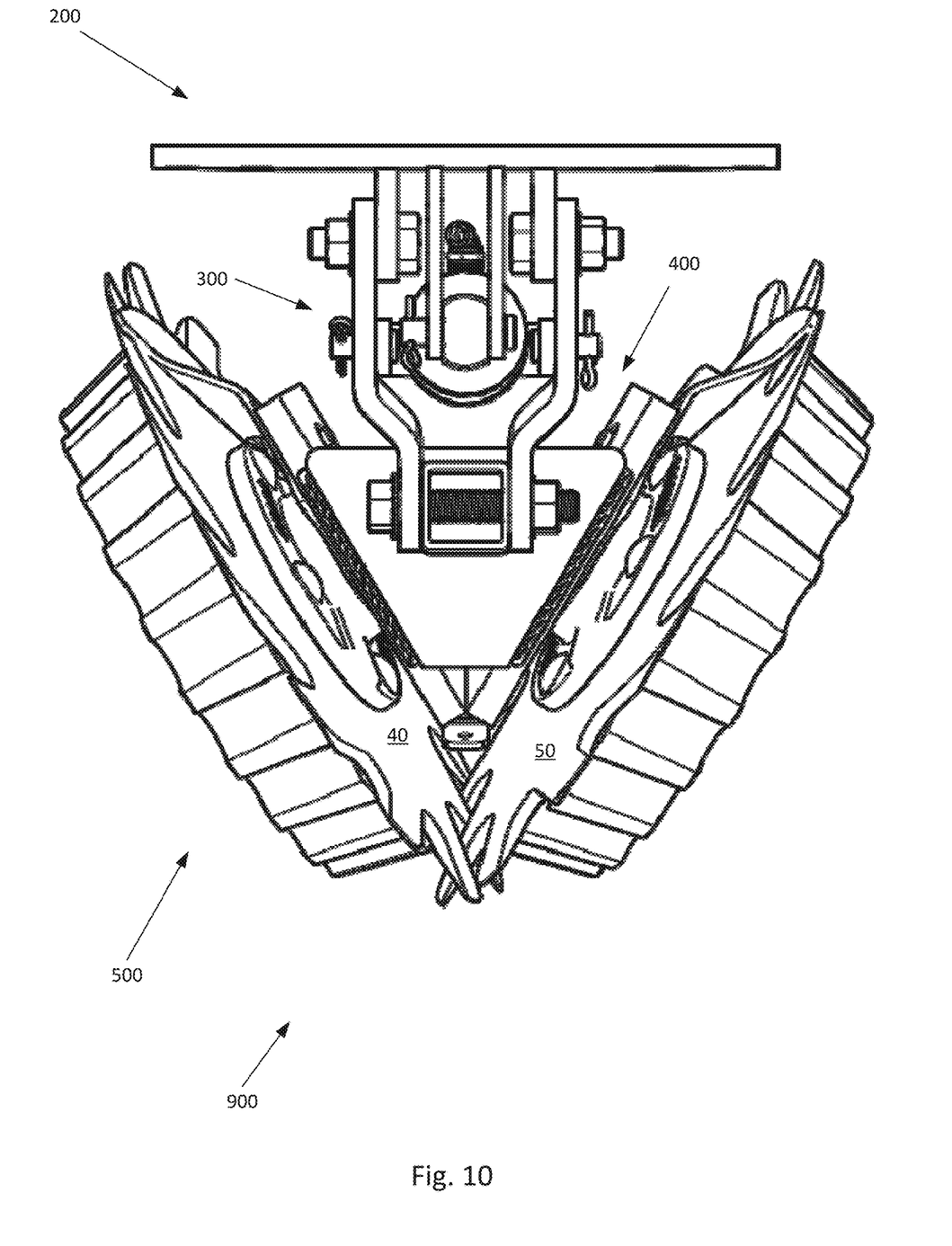
FIG. 10 provides a top view of a compact parallel arm row cleaner assembly including an improved row cleaner wheel according to an embodiment of the present invention.
Figure 11:
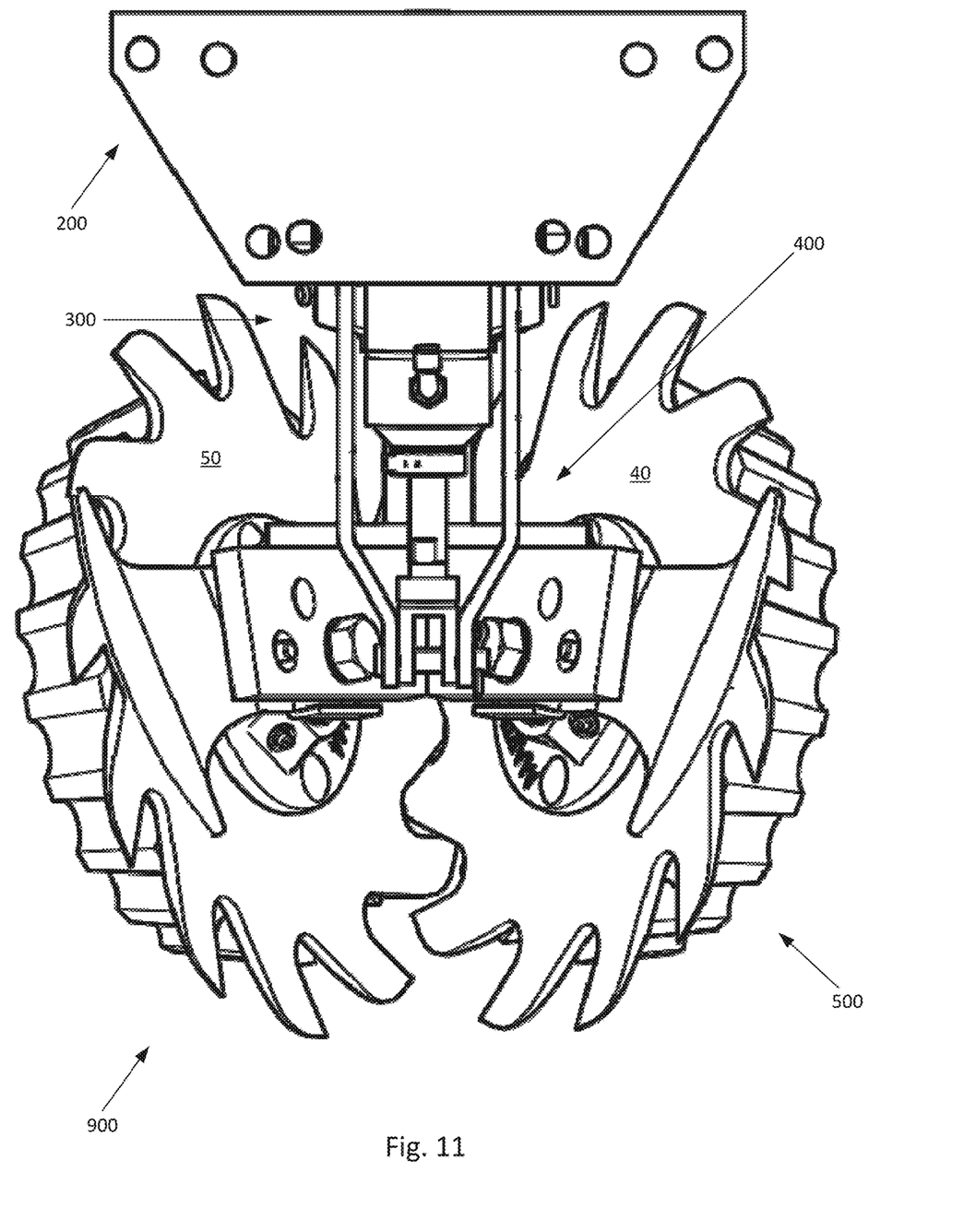
FIG. 11 provides a rear view of a compact parallel arm row cleaner assembly including an improved row cleaner wheel according to an embodiment of the present invention.

With reference now to FIGS. 9-11, various views and illustrations of an embodiment of a compact parallel arm row cleaner 100 incorporating the improved row cleaning/closing wheels 40 and 50 as a row cleaning wheel in accordance with an embodiment of the present invention are provided. As shown in FIG. 9, the compact parallel arm floating row cleaner 100 comprises a frame mounting plate 200, a parallel arm floating assembly 300, a stem assembly 400, and wheel assemblies 500 including left row cleaning wheel 40 and right row cleaning wheel 50. Row cleaning wheels 40 and 50 are configured to intermesh or intertwine or intersect in a complimentary manner to provide improved row cleaning and debris removal operation of the row cleaner during row planter operation. As described herein, the left and right row cleaning wheels include similar attributes, e.g., diameter, thickness, number of teeth, tooth configuration, but are configured for cooperative, rotational interoperation when spaced apart, oppositely faced, and angled toward one another so as to account for spatial, angular and rotational operational requirements. Row cleaning wheel dimensions preferably take into account the nature of oppositely faced rotational operations when installed on a row cleaner apparatus. The compact parallel arm floating row cleaner 100 uses the improved performance of the improved row cleaning wheels 40 and 50 to provide benefits of a fixed row cleaner assembly 10 while also providing benefits of a "horizontal" floating row cleaner.

In some of these row cleaner systems, the wheels are pushed against the ground by their weight, and the frame of the row cleaner must be long to keep the angle of the frame at the right angle of attack. In other designs a pneumatic air cylinder may be attached to the floating row cleaner to increase or decrease the pushing force of the wheels to the ground and to make the wheels more or less aggressive in digging the ground. However, these designs may still change the relative angle of the cleaning wheel assemblies to the ground as they move over terrain having different elevations or height changes. Some existing floating row cleaner designs are long, and the wheels in such designs run far ahead from the planter (i.e., they extend outwards a relatively large distance from the mount attached to the planter). One further design consideration related to angular displacement, since the frame swings around the pin point at the frame mount, the angle between the wheels and the ground changes when the frame swings.

The compact parallel arm floating row cleaner 100 is relatively as compact as pin adjust or fixed row cleaner assemblies, but can move the wheels 500 vertically, both up and down, without changing the angle between the wheels 500 and the ground. The four arms of the parallel arm floating assembly 300 keep the stem assembly 400 vertical and parallel to the frame mounting plate 200. In the embodiment provided in FIG. 9, the parallel arm floating assembly 300 is secured by a fastener to the frame mounting plate 200 and may move rotationally about the fastener by a bushing or bearing.

With reference now to FIG. 10, a top view of a compact parallel arm row cleaner 100 is provided with left and right row cleaning wheels 40 and 50. In this view, the orientation of the parallel arm floating assembly 300 with respect to the frame mounting plate 200 and the stem assembly 400 can be seen. The stem assembly 400 is positioned out a short distance from the frame mounting plate 200 by the parallel arm floating assembly 300 and is permitted to move up and down vertically with respect to the ground by the parallel arm floating assembly 300 while maintaining a generally parallel orientation with respect to the frame mounting plate 200. The relative angle of elements of the parallel arm floating assembly 300 change with respect to the frame mounting plate 200 and stem assembly 400, but the stem assembly 400 and frame mounting plate 200 maintain a substantially parallel relative orientation. FIG. 11 provides a rear view of the compact parallel arm row cleaner 100 including the frame mounting plate 200, the parallel arm floating assembly 300, the stem assembly 400, and the wheel assemblies 500 with left and right row cleaning wheels 40 and 50.

It should be noted that the present invention is not limited to the specific embodiments pictured and described herein but is intended to apply to all similar methods for ground surface penetration during operation of planter, seeder or drill unit. Accordingly, modifications and alterations from the described embodiments will occur to those skilled in the art without departure from the spirit and scope of the present invention, the scope of which is only limited by the appended claims that follow.

What is claimed is:

1. A row cleaner wheel assembly for mounting to a row cleaner assembly of a row planter, the row cleaner wheel assembly comprising:
    a row cleaner wheel mount assembly having a first portion adapted to be mounted to a row cleaner assembly and a second portion adapted for mounting one or more row cleaner wheels;
    a first row cleaning wheel being substantially circular with a circular center hub opening for mounting the first row cleaning wheel to the row cleaner wheel mount assembly and having a first set of teeth arranged about the outer circumference of the first row cleaning wheel;
    wherein each of the first set of teeth include a tooth body extending outward along the periphery of the first row cleaning wheel and having an essentially flat surface and a beveled surface that are relatively narrower at a distal end of the tooth and wider proximally toward the center of the row cleaning wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth.

2. The row cleaner wheel assembly according to claim 1 further comprising:
    a second row cleaning wheel being substantially circular and mounted to the row cleaner wheel mount assembly and having a second set of teeth arranged about the outer circumference of the second row cleaning wheel;
    wherein the first and second row cleaning wheels are disposed on the row cleaner wheel mount assembly spatially removed at respective centers and having essentially equal diameters, disposed on the row cleaner mount assembly to be oppositely facing and angled toward one another proximal to a ground surface, and angled outwardly away from one another distal to the ground surface, the relative angle being adapted to allow the first and second sets of teeth to intermesh when rotated in unison during operation of a row planter.

3. The row cleaner wheel assembly according to claim 2 wherein the relative angle is approximately 60 degrees.

4. The row cleaner wheel assembly according to claim 2 wherein the beveled surfaces of the first and second sets of teeth operate to provide a cleaning action at the intersection of the teeth during row planter operation.

5. The row cleaner wheel assembly according to claim 1 wherein the first set of teeth comprise 12 teeth separated sequentially by approximately 30 degrees relative to the center of the row cleaner wheel.

6. The row cleaner wheel assembly according to claim 1 wherein the tooth body includes a generally radiused outward surface extending outward-most from the row cleaner wheel and intermediate the parallel lines.

7. The row cleaner wheel assembly according to claim 1 wherein the tooth profile includes generally radiused transitions from the outer periphery of the row cleaner wheel.

8. The row cleaner wheel assembly according to claim 1 further comprising a second row cleaning wheel, wherein the first and second row cleaning wheels are attached to said row cleaner wheel mount assembly so that the first and second row cleaning wheels are intersectedly positioned.

9. The row cleaner wheel assembly according to claim 8 wherein the first and second row cleaning wheels are non-intersectedly positioned during an initial engagement with a ground surface.

10. A row cleaning wheel for mounting to a row cleaning assembly for use in operation of a row planter and adapted to remove debris, the row cleaning wheel comprising:
    a substantially circular body portion;
    a circular center hub opening disposed at the center of the circular body portion for positioning the row cleaning wheel on a hub of a row cleaning mount assembly;
    a set of holes for receiving fastening members for mounting the row cleaning wheel to a row cleaning wheel mount assembly; and
    a first set of teeth arranged about the outer circumference of the circular body portion;
    wherein each of the first set of teeth include a tooth body extending outward along the periphery of the first row cleaning wheel and having an essentially flat surface and a beveled surface that are relatively narrower at a distal end of the tooth and wider proximally toward the center of the row cleaning wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth.

11. The row cleaning wheel according to claim 10, wherein the row cleaning wheel is adapted for use with a second row cleaning wheel of complimentary configuration;
    wherein the first and second row cleaning wheels are disposed on a row cleaning mount assembly spatially removed at respective centers and having essentially equal diameters, disposed on the row cleaning mount assembly to be oppositely facing, and angled toward one another proximal to a ground surface and angled outwardly away from one another distal to the ground surface, the relative angle being adapted to allow the first and second sets of teeth to intermesh when rotated in unison during operation of a row planter.

12. The row cleaning wheel according to claim 11, wherein the relative angle is approximately 60 degrees.

13. The row cleaning wheel according to claim 11 wherein the beveled surfaces of the first and second sets of teeth operate to provide a cleaning action at the intersection of the teeth during row planter operation.

14. The row cleaning wheel according to claim 10 wherein the first set of teeth comprise 12 teeth separated sequentially by approximately 30 degrees relative to the center of the row cleaning wheel.

15. The row cleaning wheel according to claim 10 wherein the tooth body includes a generally radiused outward surface extending outward-most from the row cleaning wheel and intermediate the parallel lines.

16. The row cleaning wheel according to claim 10 wherein the tooth body includes generally radiused transitions from the outer periphery of the row cleaning wheel.

17. A row closing wheel assembly for mounting to a row closing assembly of a row planter, the row closing wheel assembly comprising:
a row closing wheel mount having a first portion adapted to be mounted to a row closing assembly and a second portion adapted for mounting one or more row closing wheels;
a first row closing wheel being substantially circular with a circular center hub opening for mounting the first row closing wheel to the row closing wheel mount and having a first set of teeth arranged about the outer circumference of the first row closing wheel;
wherein each of the first set of teeth include a tooth body extending outward along the periphery of the first row closing wheel and having an essentially flat surface and a beveled surface that are relatively narrower at a distal end of the tooth and wider proximally toward the center of the row closing wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth.

18. The row closing wheel assembly according to claim 17 further comprising:
a second row closing wheel being substantially circular and mounted to the row closing wheel mount and having a second set of teeth arranged about the outer circumference of the second row closing wheel;
wherein the first and second row closing wheels are disposed on the row closing mount spatially removed at respective centers and having essentially equal diameters, disposed on the row closing mount to be oppositely facing, and angled toward one another proximal to a ground surface and angled outwardly away from one another distal to the ground surface, the relative angle being adapted so that the first and second sets of teeth do not intermesh when rotated in unison during operation of a row planter.

19. The row closing wheel assembly according to claim 18 wherein the beveled surfaces of the first and second sets of teeth operate to provide a closing action during row planter operation.

20. The row closing wheel assembly according to claim 17 wherein the tooth body includes a generally radiused outward surface extending outward-most from the row cleaner wheel and intermediate the parallel lines.

21. A row closing wheel for mounting to a row closing assembly for use in operation of a row planter and adapted to close a furrow, the row closing wheel comprising:
a substantially circular body portion;
a circular center hub opening disposed at the center of the circular body portion for positioning the row closing wheel on a hub of a row closing mount;
a set of holes for receiving fastening members for mounting the row closing wheel to a row closing wheel mount; and
a first set of teeth arranged about the outer circumference of the circular body portion;
wherein each of the first set of teeth include a tooth body extending outward along the periphery of the first row closing wheel and having an essentially flat surface and a beveled surface that are relatively narrower at a distal end of the tooth and wider proximally toward the center of the row closing wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth.

22. The row closing wheel according to claim 21, wherein the row closing wheel is adapted for use with a second row closing wheel of complimentary configuration;
wherein the first and second row closing wheels are adapted to be disposed on a row closing mount spatially removed at respective centers and having essentially equal diameters, disposed on the row closing mount to be oppositely facing, and angled toward one another proximal to a ground surface and angled outwardly away from one another distal to the ground surface, the relative angle being adapted to prevent the first and second sets of teeth from intermeshing when rotated in unison during operation of a row planter.

23. The row closing wheel according to claim 21 wherein the tooth body includes a generally radiused outward surface extending outward-most from the row closing wheel and intermediate the parallel lines.

24. The row closing wheel according to claim 21 wherein the tooth body includes generally radiused transition from the outer periphery of the row closing wheel.

25. The row closing wheel according to claim 22 wherein the beveled surfaces of the first and second sets of teeth promote a furrow closing action during row planter operation.

* * * * *